(12) United States Patent
Kornegay et al.

(10) Patent No.: US 10,831,894 B2
(45) Date of Patent: Nov. 10, 2020

(54) DECENTRALIZED ROOT-OF-TRUST FRAMEWORK FOR HETEROGENEOUS NETWORKS

(71) Applicant: Morgan State University, Baltimore, MD (US)

(72) Inventors: Kevin Tyrone Kornegay, Towson, MD (US); Willie Lee Thompson, II, Perry Hall, MD (US)

(73) Assignee: Morgan State University, Baltimore, MD (US)

( * ) Notice: Subject to any disclaimer, the term of this patent is extended or adjusted under 35 U.S.C. 154(b) by 307 days.

(21) Appl. No.: 15/865,661

(22) Filed: Jan. 9, 2018

(65) Prior Publication Data

US 2018/0196945 A1 Jul. 12, 2018

Related U.S. Application Data

(60) Provisional application No. 62/444,902, filed on Jan. 11, 2017.

(51) Int. Cl.
*G06F 21/57* (2013.01)
*G06F 21/44* (2013.01)
(Continued)

(52) U.S. Cl.
CPC .............. *G06F 21/57* (2013.01); *G06F 21/44* (2013.01); *G06F 21/6218* (2013.01); *G06F 21/85* (2013.01); *H04L 9/0844* (2013.01); *H04L 9/0897* (2013.01); *H04L 9/3234* (2013.01); *H04W 12/08* (2013.01);
(Continued)

(58) Field of Classification Search
CPC ...... G06F 21/57; G06F 21/44; G06F 21/6218; G06F 21/85; H04W 12/1208; H04W 12/08; H04W 12/00512; H04L 9/0844; H04L 9/0897; H04L 9/3234; H04L 2209/805
See application file for complete search history.

(56) References Cited

U.S. PATENT DOCUMENTS

7,325,134 B2  1/2008 Fascenda
7,853,788 B2  12/2010 Fascenda
(Continued)

*Primary Examiner* — Hee K Song
(74) *Attorney, Agent, or Firm* — Whiteford, Taylor & Preston, LLP; Gregory M. Stone (57) ABSTRACT

Systems and methods are disclosed for providing a trusted computing environment that provides data security in commodity computing systems. Such systems and methods deploy a flexible architecture comprised of distributed trusted platform modules (TPMs) configured to establish a root-of-trust within a heterogeneous network environment comprised of non-TPM enabled IoT devices and legacy computing devices. A data traffic module is positioned between a local area network and one or more non-TPM enabled IoT devices and legacy computing devices, and is configured to control and monitor data communication among such IoT devices and legacy computing devices, and from such IoT devices and legacy computing devices to external computers. The data traffic module supports attestation of the IoT devices and legacy computing devices, supports secure boot operations of the IoT devices and legacy computing devices, and provides tamper resistance to such IoT devices and legacy computing devices.

18 Claims, 6 Drawing Sheets

(51) Int. Cl.
　　　*G06F 21/62*　　　(2013.01)
　　　*H04L 9/32*　　　(2006.01)
　　　*H04L 9/08*　　　(2006.01)
　　　*H04W 12/08*　　(2009.01)
　　　*G06F 21/85*　　　(2013.01)
　　　*H04W 12/12*　　(2009.01)
　　　*H04W 12/00*　　(2009.01)

(52) U.S. Cl.
　　　CPC ... *H04W 12/1208* (2019.01); *H04L 2209/805* (2013.01); *H04W 12/00512* (2019.01)

(56) References Cited

U.S. PATENT DOCUMENTS

| | | | |
|---|---|---|---|
| 8,364,978 | B2 | 1/2013 | Fascenda et al. |
| 9,317,708 | B2* | 4/2016 | Lee .................. G06F 21/6218 |
| 9,576,450 | B2 | 2/2017 | Salle et al. |
| 10,270,770 | B1* | 4/2019 | Irwan ................. H04L 63/0876 |
| 10,346,614 | B1* | 7/2019 | Ko ..................... H04L 65/1036 |
| 2016/0253664 | A1* | 9/2016 | Yuan .................. H04L 63/0281 705/71 |
| 2016/0350534 | A1* | 12/2016 | Poornachandran ..... G06F 21/57 |
| 2017/0054707 | A1 | 2/2017 | Leicher et al. |
| 2017/0126647 | A1* | 5/2017 | Zhang .................... H04L 63/08 |
| 2017/0308705 | A1* | 10/2017 | Karaginides .......... G06F 21/575 |
| 2018/0109538 | A1* | 4/2018 | Kumar .................. H04L 63/10 |
| 2018/0183603 | A1* | 6/2018 | Liu .......................... H04L 9/14 |
| 2018/0189661 | A1* | 7/2018 | Tatourian ................ H04W 4/38 |
| 2019/0319843 | A1* | 10/2019 | Telfer ................. H04L 41/0893 |

* cited by examiner

DECENTRALIZED ROOT-OF-TRUST FRAMEWORK FOR HETEROGENEOUS NETWORKS

CROSS REFERENCE TO RELATED APPLICATIONS

This application is based upon and claims the benefit of U.S. Provisional Application No. 62/444,902 titled "A Decentralized Root-of-Trust Framework for Heterogeneous Networks," filed with the United States Patent & Trademark Office on Jan. 11, 2017, the specification of which is incorporated herein by reference in its entirety.

GOVERNMENT LICENSE RIGHTS

This invention was made with government support under Contract No. FAIN 1458930 awarded by the National Science Foundation. The U.S. government may have certain rights in the invention.

FIELD OF THE INVENTION

This invention relates to systems and methods for trusted computing in a heterogeneous network, and more particularly to systems and methods for establishing a hardware-based root-of-trust within a heterogeneous network comprised of non-TPM (Trusted Platform Module) enabled Internet of Things (IoT) devices and legacy computing devices.

BACKGROUND OF THE INVENTION

The networking of devices for purposes of data communication continues to grow in popularity. However, as networks of varying types of devices continue to grow, so does the risk of unauthorized access to data. As a result, strong security of internet applications and services used by data-connected or so-called "smart" devices is critical to promoting trust and use of such devices. This includes the emerging markets of, by way of example, the Internet of Things (IoT). Disruption of services through the IoT can have global consequences to electronic commerce, technical innovation, and practically every other aspect of online activities.

As enterprises and manufacturers add tens of thousands of devices to their networks, IoT security has thus become a critical issue. For example, in December 2016, a major domain name company experienced a Distributed Denial of Service (DDoS) attack from malware, in which a number of interconnected IoT devices were being used to conduct cyber attacks, resulting in the disruption of Internet services across the United States.

Such increased connectivity created by the IoT thus brings new opportunities for nefarious characters to exploit potential security vulnerabilities. Poorly secured IoT devices can serve as entry points for cyber attack by allowing malicious individuals to reprogram a device, cause a malfunction, or steal valuable data. Competitive cost and technical constraints on IoT devices challenge manufacturers to adequately design security features into these devices, potentially creating security and long-term maintainability vulnerabilities greater than their traditional computer counterparts. Newer IoT devices and computing devices can be equipped with a Trusted Platform Module (TPM) (an international standard for a secure cryptoprocessor) comprising a dedicated microcontroller designed to secure hardware by integrating cryptographic keys into devices. However, given the large number of legacy IoT devices in existence, which are generally non-compliant with more current network and computer hardware security protocols (and which typically lack TPM functionality), they are primed to become "zombie" devices that have outlived their manufacturer security patching and support, yet still require network connectivity to function. There is a present need for architecture that may reduce the threat of compromise due to outdated, non-TPM enabled firmware and that can prevent large scale coordinated attacks.

Efforts have been made to provide secure network communications in a variety of contexts, though there remains a need in the art for systems and methods capable of securing communications to and from legacy Internet-of-Things devices and computing platforms that lack TPMs. For instance, U.S. Pat. No. 7,853,788 to Fascenda employs physical keys to enable encryption, along with authentication using random number generation. U.S. Pat. No. 7,325,134 to Fascenda and U.S. Pat. No. 8,364,978 to Fascenda, et al. disclose anti-tampering and key registration to provide hardware security. U.S. Pat. No. 9,576,450 to Salle, et al. provides anti-tamper via hardware design. U.S. Pat. No. 9,317,708 to Lee, et al. discloses a central authority sharing keys with only devices in its network, enabled by hardware-rooted encryption and cryptographic hashing and through a special tamper-resistant hardware register. U.S. Patent Application Publication No. 2017/0054707 of Leicher, et al. discloses a trusted platform module with embedded remote attestation and sealing and binding capabilities for data. The specifications of all of the foregoing are incorporated herein by reference in their entireties.

Despite such prior efforts, there remains a need in the art for comprehensive systems and methods for securing a heterogeneous network including legacy, non-TPM enabled devices employing the characteristics of standards-based hardware platforms, and that particularly can provide such security through a firmware combination featuring remote attestation, integrity measuring, secure boot operations, remote authentication, and anti-tamper characteristics.

SUMMARY OF THE INVENTION

Disclosed herein are systems and methods for providing a trusted computing environment that provides data security in commodity computing systems. Such systems and methods deploy a flexible architecture comprised of distributed TPMs that are configured to establish a root-of-trust within a heterogeneous network environment comprised of non-TPM enabled IoT devices and legacy computing devices. A data traffic module is positioned between a local area network and one or more non-TPM enabled IoT devices and legacy computing devices, and is configured to control and monitor data communication among such IoT devices and legacy computing devices, and from such IoT devices and legacy computing devices to external computers. In accordance with certain aspects of an embodiment, the data traffic module supports attestation of the IoT devices and legacy computing devices, supports secure boot operations of the IoT devices and legacy computing devices, and provides tamper resistance to such IoT devices and legacy computing devices. In accordance with further aspects of an embodiment, the data traffic module is configured to provide one or more of the following functions: (i) secure boot, which allows the system to boot into a defined and trusted configuration; (ii) strong memory isolation, in which memory cannot be accessed by other processes including operating systems and debuggers; (iii) sealed storage to house cryptographic keys and secrets; (iv) secure I/O operations to thwart attacks such as key-stroke logging and screen scraping; (v) integrity measuring by computing hashes of executable code, configuration data, and other system state information; (vi) remote attestation, which allows a trusted device to present reliable evidence to remote parties about the software it is running; (vii) built-in tamper resistance; (viii) public key cryptographic operations and random number generation; (ix) real-time traffic monitoring and control; and (x) adaptive access control.

In accordance with certain aspects of an embodiment, a system for providing a root-of-trust in a heterogeneous computer network is provided, comprising a local area network, a non-TPM enabled legacy network having one or more legacy components comprising one or more of a non-TPM enabled IoT device and a non-TPM enabled computing device, and a data traffic module in data communication with the non-TPM enabled legacy network and positioned between the local area network and the non-TPM enabled network, the data traffic module having computer executable code stored thereon configured to provide remote attestation of the one or more legacy components to a trusted remote host computer outside of the system.

In accordance with further aspects of an embodiment, a data traffic module is provided comprising a first data communication port configured for data communication with a first computer network, a second data communication port configured for data communication with a second computer network comprising a non-TPM enabled legacy network having one or more legacy components comprising one or more of a non-TPM enabled IoT device and a non-TPM enabled computing device, and at least one processor having computer executable code stored thereon configured to provide remote attestation of the one or more legacy components to a trusted remote host computer outside of said system.

BRIEF DESCRIPTION OF THE DRAWINGS

The numerous advantages of the present invention may be better understood by those skilled in the art by reference to the accompanying drawings in which.

DETAILED DESCRIPTION

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
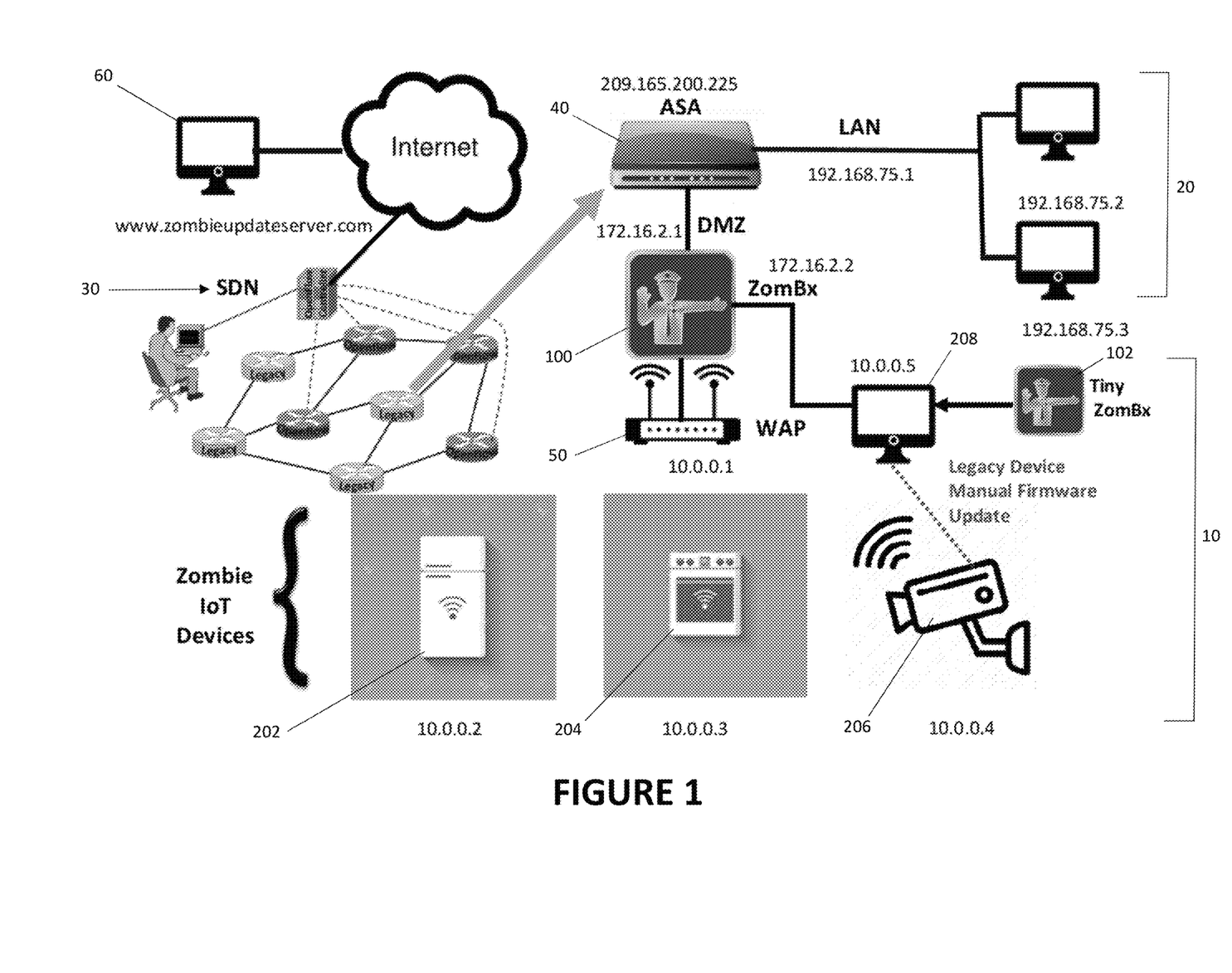
FIG. 1 is a schematic view of a system for providing a root-of-trust in a heterogeneous computer network in accordance with certain aspects of an embodiment of the invention.

With reference to the schematic view of FIG. 1, a data traffic module 100 is provided on a heterogeneous network that includes one or more Internet of Things (IoT) devices, such as refrigerators 202, cooking appliances 204, cameras 206, etc. having interne connectivity, and computing devices 208 (such as laptop computers, desktop computers, tablet computers, etc.) with internet connectivity, but in each case which lack embedded trusted platform modules (TPMs). Such non-TPM enabled, heterogeneous network of IoT devices and computing devices is referred to herein as a non-TPM enabled legacy network (shown generally at 10). As shown in the schematic view of FIG. 1, the data traffic module 100 is positioned such that all data traffic to and from the non-TPM enabled legacy network 10 passes through the data traffic module 100, thus allowing the data traffic module 100 to determine whether such data traffic is authorized or potentially malicious, in which case such data traffic may be intercepted, blocked, or otherwise processed in a manner that prevents unauthorized communications with the network 10. Moreover, the non-TPM enabled legacy network 10 is isolated in what may be referred to as a "demilitarized zone" from the private local area network (LAN), shown generally at 20.

With continued reference to FIG. 1, the system and method in accordance with certain aspects of an embodiment may form a part of broader computing network, such as the heterogeneous network comprised of open flow software defined network (SDN) controllers and switches (shown generally at 30), a firewall device 40 such as an adaptive security appliance (ASA, readily commercially available from CISCO), a wireless access point (WAP) 50, and the demilitarized zone comprising several non-TPM enabled IoT and legacy computing devices, such as (by way of non-limiting example) a smart refrigerator 202, smart microwave oven 204, or smart camera 206. As will be readily apparent to those skilled in the art, other non-TPM enabled IoT devices and legacy computing devices may likewise be added to the non-TPM enabled legacy network 10 so as to benefit from the functionality provided by the data traffic module 100.

In the framework depicted in FIG. 1, a hard security policy rule is implemented placing all non-TPM enabled IoT and legacy computing devices inside of the demilitarized zone of the non-TPM enabled legacy network 10, which as noted above is isolated from the private LAN 20. In this exemplary configuration, the data traffic module 100 monitors and controls all network traffic to and from all non-TPM enabled IoT and legacy computing devices in the non-TPM enabled legacy network 10 in real time. Such monitoring and control is implemented by the data traffic module 100 using the host identity protocol (HIP) bolstered by rigid access rules to prevent botnet distributed denial of service (DDoS) attacks. For example, if a remote host 60 and a client device in the non-TPM enabled legacy network 10 fail to establish trust, and the client firmware and configuration hashtags do not match any of the hashtags stored in secure memory on the data traffic module 100 as discussed below, then access to such client device in the non-TPM enabled legacy network 10 is denied by the data traffic module 100. HIP, as is known to those skilled in the art, is a host identification technology developed for the internet, which separates the end-point identifier and locator roles of internet protocol addresses. HIP enables host mobility and multi-homing across different address families (e.g., IPv4 and IPv6), offers end-to-end encryption and protection against certain DDoS attacks, allows moving away from IP address-based access control to permanent host identifiers, and restores end-to-end host identification in the presence of several addressing domains separated by Network Address Translation (NAT) devices.

Figure 2:
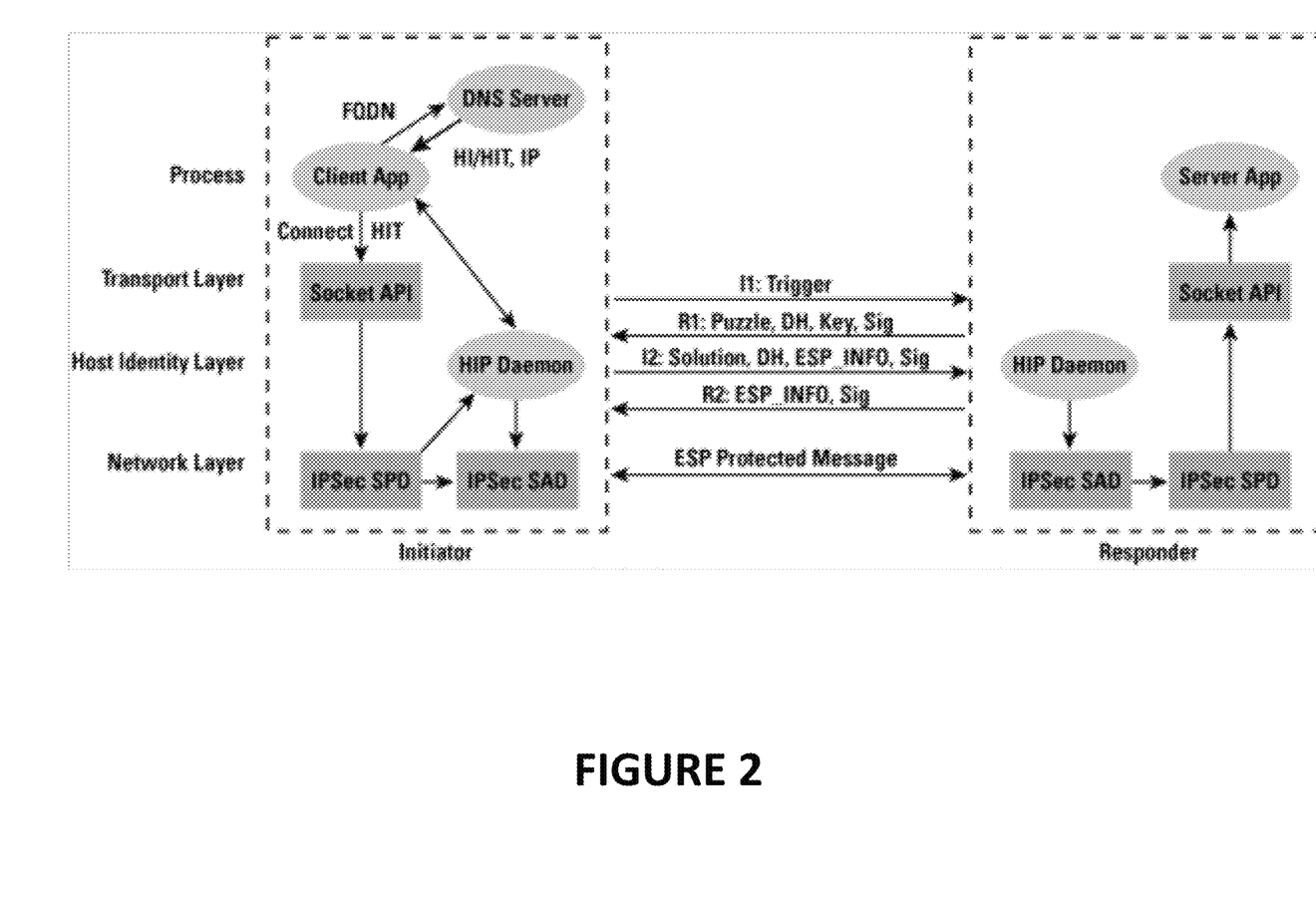
FIG. 2 is a flowchart showing host identity protocol base-exchange employed by the system of FIG. 1.

A client host obtains the host identify of a server from the Domain Name System (DNS). A host identifier is a 128-bit long string known as the host identity tag (HIT) that is constructed by performing hash functions on host public keys. To communicate via HIP protocol, two hosts must establish a HIP association known as the HIP base-exchange (BEX, a key exchange protocol known to those skilled in the art), which consists of four messages I1, R1, I2, and R2 that are exchanged between the initiator and the responder. After BEX is successfully completed, both hosts are confident that the private keys corresponding to host identifiers are indeed possessed by their peers. This exchange is illustrated in FIG. 2.

In application of the system and method set forth herein in accordance with certain aspects of an embodiment, if the HIP BEX fails and the client device in the non-TPM enabled legacy network 10 produces firmware and configuration hashtags that do not match any of the hashtags stored in secure memory on the data traffic module 100, access to such client device in the non-TPM enabled legacy network 10 is denied. Additionally, any unauthorized or unusual access by any device in the non-TPM enabled legacy network 10 to another device on that network will cause the data traffic module 100 to produce an automated response to initiate a quarantine of the source client device.

In addition to the data traffic module 100, non-TPM enabled legacy computing devices 208 in the non-TPM enabled legacy network 10 may be provided separate auxiliary data traffic modules 102, which are configured to service desktop computers, laptop computers, mobile computers, and such other computing devices within the non-TPM enabled legacy network 10 as may occur to those skilled in the art, during a legacy computing device manual firmware update. As will be discussed in greater detail below, such auxiliary data traffic modules 102 work in tandem with the data traffic module 100 to perform remote attestation and authentication on each respective legacy computing device 208 in order to prevent firmware downgrade/rollback attacks. Both the data traffic module 100 and the auxiliary data traffic modules 102 provide tamper resistance and support data integrity measurements on bitstreams and firmware, as well as secure boot operation.

Data traffic module 100 may be implemented on a programmable multi-processor system-on-chip (MPSoC), such as (by way of non-limiting example) through the XILINX SDSoC design suite implemented on a readily commercially available XILINX ZCU102 board. In this configuration, the data traffic module includes standard peripheral and serial interfaces including CAN, GigE, SPI, UART, and JTAG, as well as a processor such as a XILINX ULTRASCALE MPSoC as the core processing element. In this configuration, data traffic module 100 provides a distributed trusted platform module function to the legacy components (i.e., non-TPM enabled IoT devices 202, 204, 206, and non-TPM enabled legacy computing elements 208) in the non-TPM enabled network 10, thus establishing a root-of-trust within such heterogeneous network environment. More particularly, in this configuration, data traffic module 100 is configured to perform preferably each of the following functions: (i) secure boot, which allows the system to boot into a defined and trusted configuration; (ii) strong memory isolation, in which memory cannot be accessed by other processes including operating systems and debuggers; (iii) sealed storage to house cryptographic keys and secrets; (iv) secure I/O operations to thwart attacks such as key-stroke logging and screen scraping; (v) integrity measuring by computing hashes of executable code, configuration data, and other system state information; (vi) remote attestation, which allows a trusted device to present reliable evidence to remote parties about the software it is running; (vii) built-in tamper resistance; (viii) public key cryptographic operations and random number generation; (ix) real-time traffic monitoring and control; and (x) adaptive access control.

Data traffic module 100 is thus configured to provide integrity measurement to the various legacy components in the non-TPM enabled network 10. Integrity measurement is the process by which information about the software, hardware, and configuration of a system is collected and digested. At load-time, the data traffic module 100 and auxiliary data traffic modules 102 use hash functions to fingerprint executables and input data, or a sequence of application files. The hashtags are used in remote attestation (discussed below) to reliably establish code identity to remote or local verifiers. The hashtags are also used in conjunction with the sealed storage feature of the data traffic module 100. A secret can be sealed along with a list of hashtags of programs that are permitted to unlock the secret. This allows for the creation of data files that can only be opened by specific applications.

As referenced above, data traffic module 100 and auxiliary data traffic modules 102 provide remote attestation for the legacy components of the non-TPM enabled network 10. Attestation is a mechanism for software to prove its identity. The goal of attestation is to prove to a remote party that your operating system and application software are intact and trustworthy. The verifier trusts that the attestation data is accurate because it is signed by a TPM whose key is certified by a certification authority (CA). The data traffic module 100 configured as described above is provided with a public/private key pair built into the hardware, which is known as the endorsement key (EK). The EK is unique to a particular TPM and is signed by a trusted CA.

Figure 3:
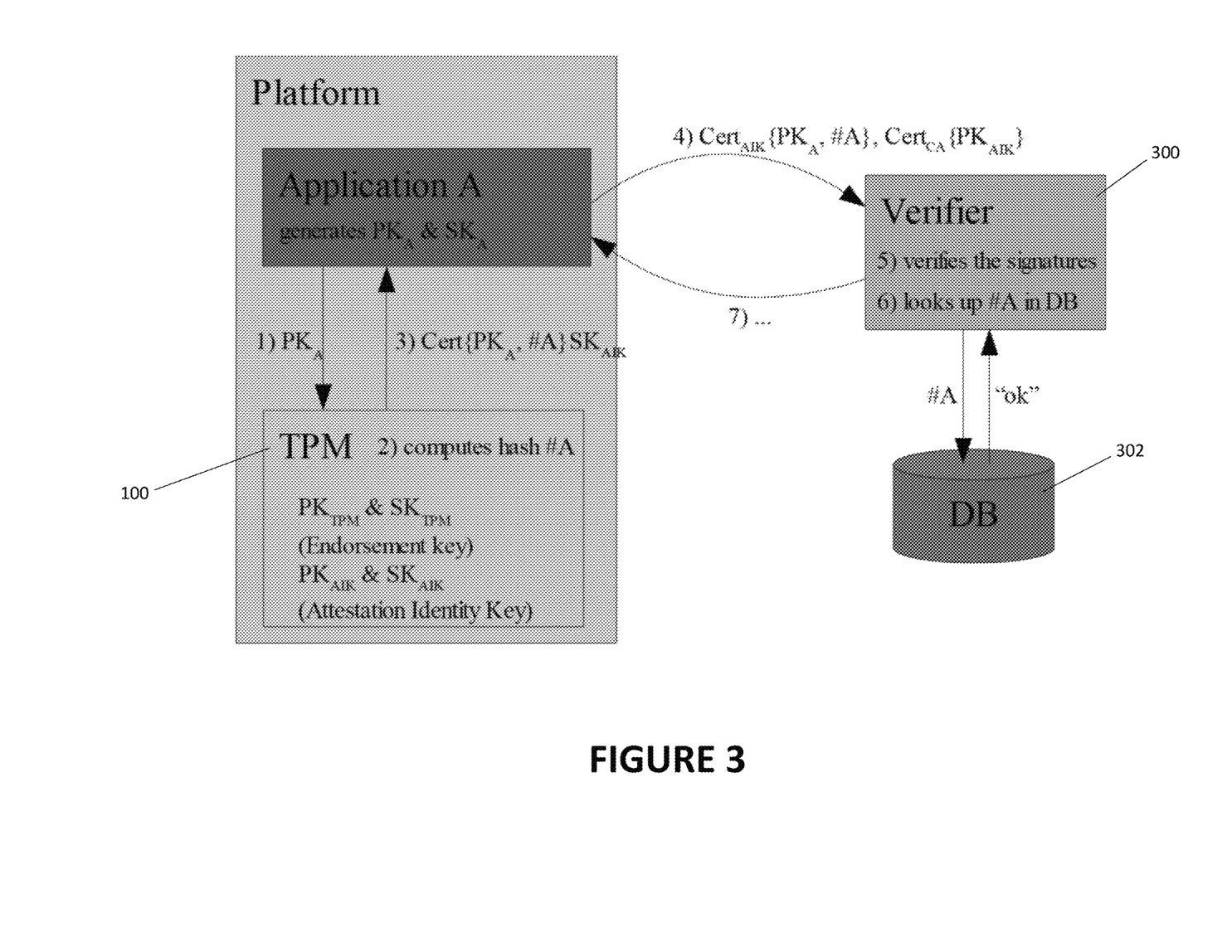
FIG. 3 is a flowchart showing remote attestation implemented by a data traffic module in accordance with certain aspects of an embodiment of the invention.

FIG. 3 is a flowchart depicting the remote attestation implemented by the data traffic module 100. In the remote attestation process in accordance with certain aspects of an embodiment, application "A" may reside on hardware, software, a server computer, or other device external to non-TPM enabled legacy network 10. By way of non-limiting example, application "A" may comprise a remotely downloadable firmware update for a legacy component on legacy network 10. In this configuration, application "A" may generate a public/private key pair $PK_A$ and $SK_A$, and then asks the data traffic module 100 to certify such key pair. In alternative configurations, data traffic module 100 itself may generate such public/private key pair, and may then proceed to certify such key pair. The data traffic module 100 then computes a hashtag # A of the executable code of program "A". Next, the data traffic module 100 creates a certification including $PK_A$ and # A, and signs the certification with the attestation identity key $SK_{AIK}$. When application "A" wishes to authenticate itself to a remote party 300, it sends the certification of its public key and hash value # A along with a certification issued to the data traffic module by a trusted certification authority (CA). The remote party then verifies the signatures in the certification chain. The remote party also looks up #A in a database 302, which maps hash values to trust levels. If application "A" is deemed trustworthy, data traffic module 100 continues communication with the remote device maintaining application "A" using $PK_A$ to establish a session key, in turn allowing communication to proceed from such remote device to one of the legacy components (202, 204, 206, 208) on the non-TPM enabled legacy network 10.

Figure 4:
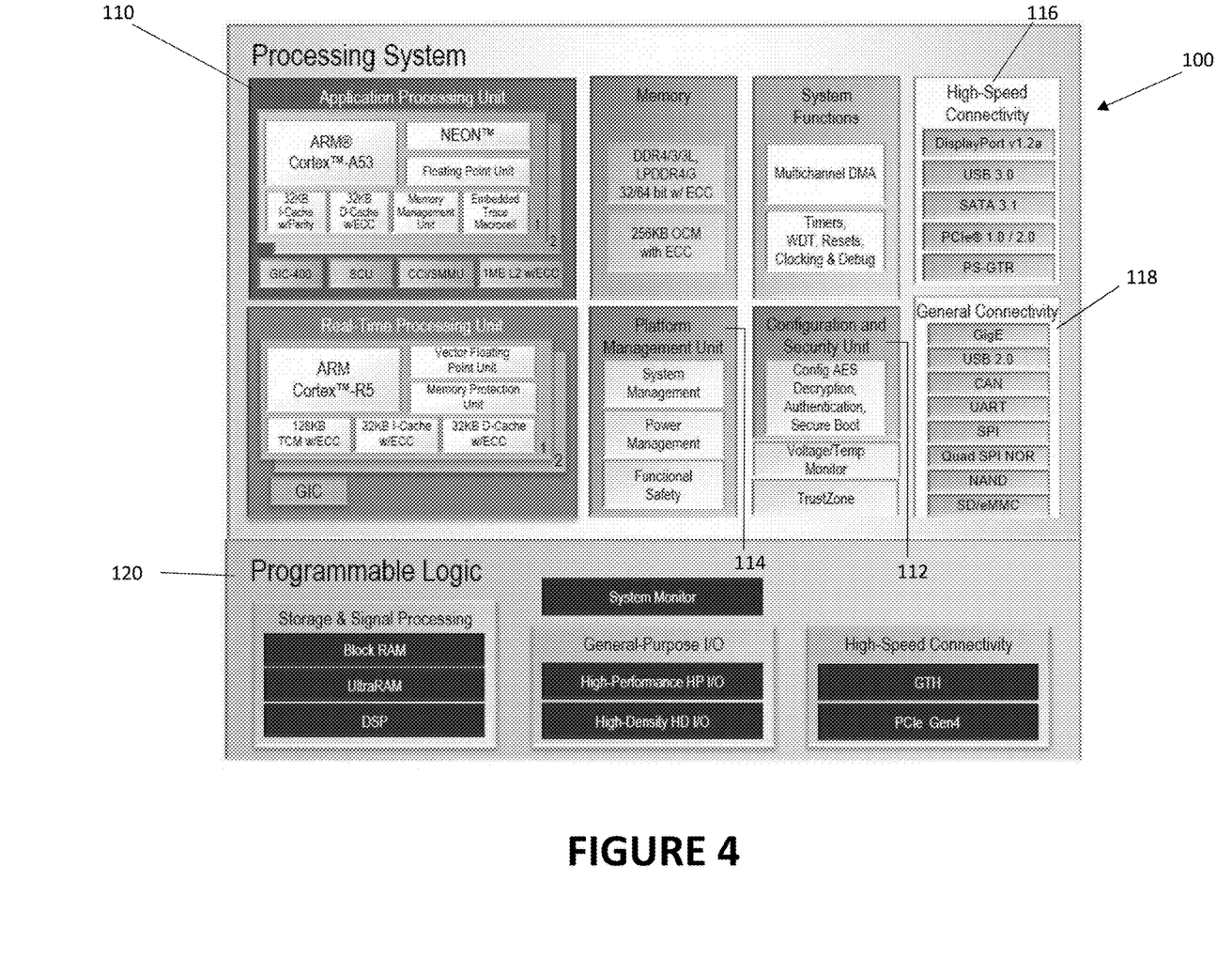
FIG. 4 is a schematic block diagram of a data traffic module for use in the system of FIG. 1 and in accordance with certain aspects of an embodiment of the invention.

FIG. 4 is a schematic block diagram of the data traffic module 100. With reference to FIG. 4, and in accordance with an exemplary configuration, data traffic module 100 includes an application processing unit 110 with dual ARM Cortex A53 and dual real-time ARM Cortex R5 processors, a configuration and security unit (CSU) 112, which is responsible for security and boot related functions, a platform management unit 114, high-speed 116 and general 118 connectivity, and a programmable logic core 120 with general purpose I/O, memory, digital signal processing blocks, and high-speed transceivers to support networking applications. In certain configurations, data traffic module 100 may use XILINX Ethernet MAC and PHY layer IP cores to facilitate additional Ethernet connectivity.

Figure 5:
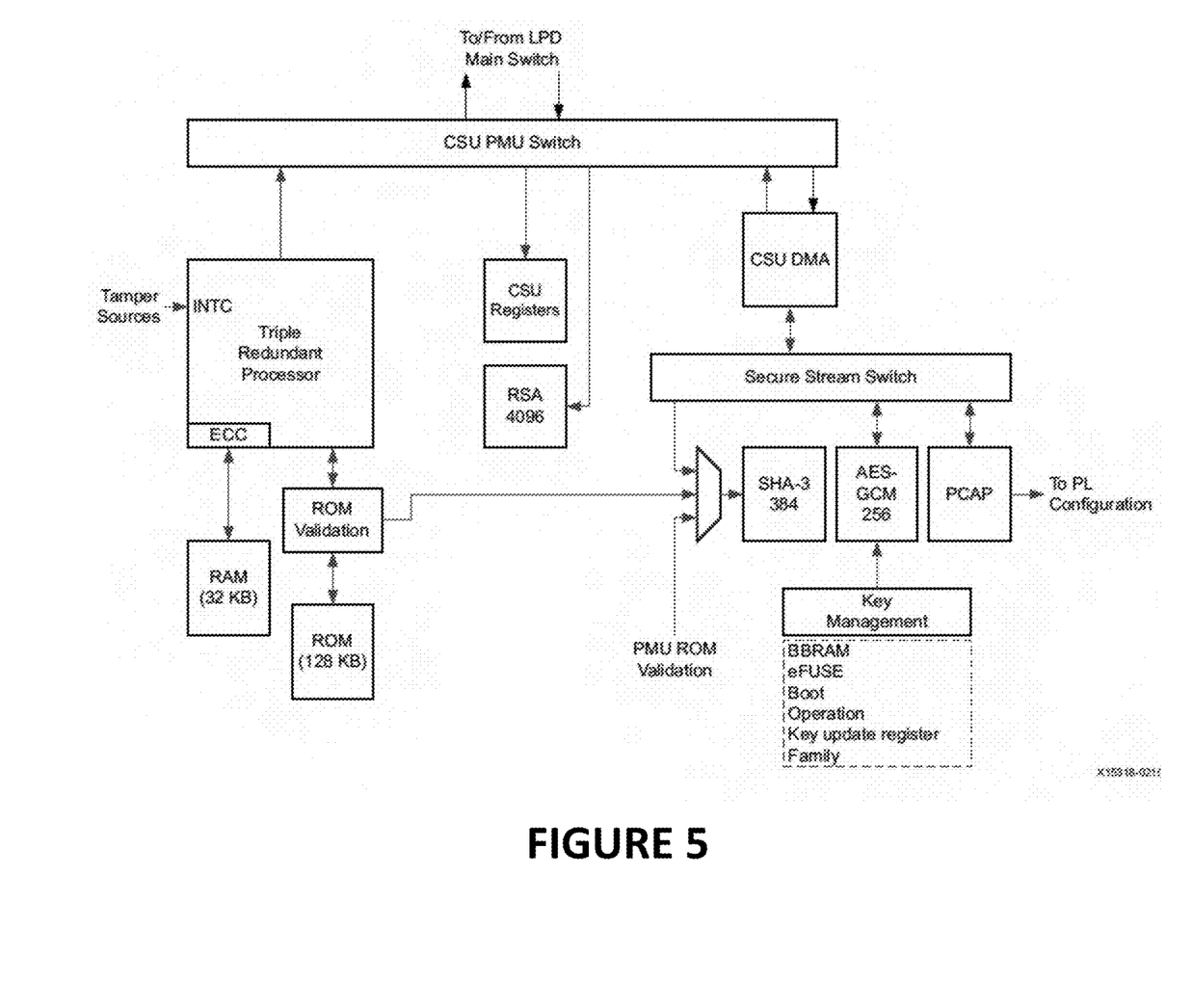
FIG. 5 is a schematic block diagram of the CSU of the data traffic module of FIG. 4.

FIG. 5 is a schematic block diagram of the CSU 112 of the data traffic module 100. With reference to the exemplary configuration of FIG. 5, the CSU 112 in data traffic module 100 configured as above is comprised of two main blocks. The first is the secure processor block (SPB) that contains a triple redundant processor for controlling the boot operation. The SPB also contains an associated read-only memory (ROM), a small private random access memory (RAM), and the necessary control/status registers required to support all security operations. The second block is the crypto interface block (CIB), which contains the AES-GCM, DMA, SHA-3, RSA, and processor configuration access port (PCAP) interfaces. After boot, the CSU is used for tamper response monitoring.

As mentioned above, the SPB on the CSU configured as above contains a triple redundant processor, which ensures an error-free operation of the data traffic unit. The 128 KB ROM is used to store the secure ROM code program. The ROM code passes an integrity check using the SHA-3 prior to being executed. The 32 KB RAM is used as a local secure data storage including error correction codes (ECC).

The SPB configured as above is adapted to perform preferably each of the following functions: (i) manage the secure/non-secure boot process from all listed boot devices in the non-TPM enabled legacy network 10; (ii) release the real-time processing unit or application processing unit out of reset when the corresponding first-stage boot loader (FSBL) is ready; (iii) support tamper detection; (iv) provide key management, along with support for key rolling functionality; (v) provide a triple-redundant processor with an ECC memory bus to access RAM; (vi) provide ROM integrity checking using SHA-3; and (vii) receive an uninterruptible clock signal from an internal clock oscillator. The secure stream switch controls data movement through the block. The primary function of the CSU SPB post-boot is to monitor the system for a tamper response and execute a secure lockdown.

Figure 6:
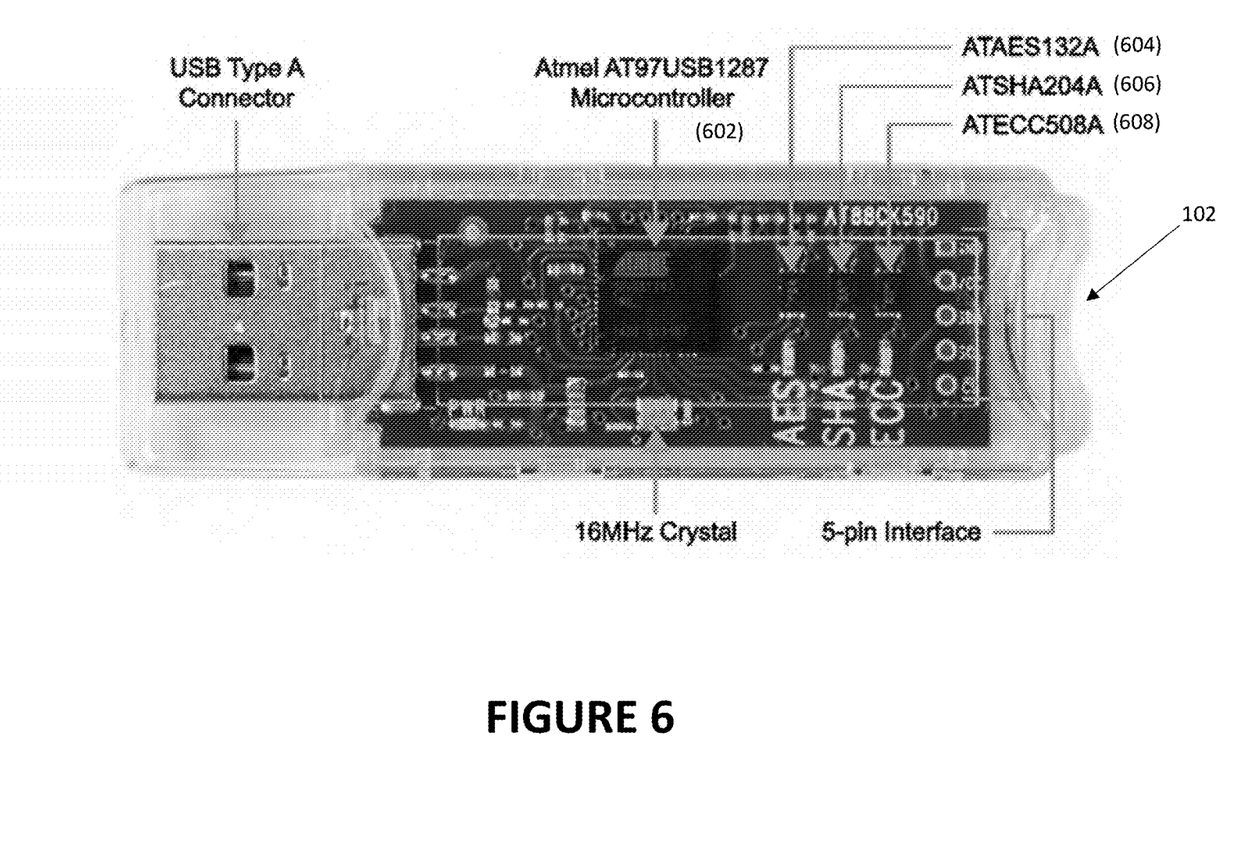
FIG. 6 is a schematic view of an auxiliary data traffic module for use in the system of FIG. 1 and in accordance with certain aspects of an embodiment of the invention.

As mentioned above, in addition to data traffic module 100, non-TPM enabled legacy network 10 may include auxiliary data traffic modules 102 that are provided to each non-TPM enabled legacy computing unit 208 (desktop computer, laptop computer, mobile computer, etc.) in non-TPM enabled legacy network 10. In an exemplary configuration and as shown in FIG. 6, such auxiliary data traffic modules 102 may comprise a crypto/authentication dongle, which may be implemented (by way of non-limiting example) using a readily commercially available ATMEL Crypto/Authentication Universal Serial Bus (USB) dongle. Such an exemplary dongle may include a microcontroller unit 602 and three major security modules. Those security modules all include hardware-based key storage, and may be configured to support authentication, encryption and decryption, and message authentication codes, effectively allowing for confidentiality, data integrity, and authentication when used with microcontroller units running encryption/decryption algorithms.

More particularly, with respect to the first such security module 604, the ATAES132A provides hardware-based key storage, and provides a very fast, high-security, serial 32 Kb electrically erasable programmable read-only memory (EEPROM) that enables authentication and confidential non-volatile data storage. Its 128-bit crypto engine provides authentication, stored data encryption/decryption, and message authentication codes (MACs). Data encryption/decryption can be performed on internally stored data or small data packets, depending on the configuration. Next, the second such security module 606 comprises the ATSHA204A, which also has hardware-based key storage and provides flexible user-configured security to support a wide range of applications. It implements a 256-bit secure hash algorithm and contains 4.5 Kb of EEPROM for secure key secure data storage. This module also implements client-side security that supports full symmetric authentication. Finally, the third such security module 608 comprises the ATECC508A, which also provides secure hardware-based key storage and supports full 256-bit ECC and integrates elliptical curve Diffie-Hellman (ECDH) key agreement, which makes it easy to add confidentiality to nodes in a networking environment. ECDH is an anonymous key agreement protocol that allows two parties, each having an elliptic curve public-private key pair, to establish a shared secret over an insecure channel. The module also implements the elliptic curve digital signature algorithm (ECDSA) to provide sign-verify capabilities for secure asymmetric authentication. The combination of ECDH and ECDSA provides three layers of security such as confidentiality, data integrity, and authentication when used with microcontroller units running encryption/decryption algorithms.

The auxiliary data traffic modules 102 configured as above perform several key security functions when used in the system and methods according to an embodiment of the invention, which key security functions provide secure legacy device firmware updates within the non-TPM enabled legacy network 10. These key security functions include: (i) legacy non-TPM enabled computing device authentication; (ii) firmware data integrity checking; and (iii) firmware version verification and update to prevent rollback attacks.

The authentication process for the auxiliary data traffic modules 102 uses a challenge-response pair selected from a challenge-response pool. The data traffic module 100 maintains a table of the host identity tags of every legacy device in the non-TPM enabled legacy network 10. Before downloading firmware, a challenge from the data traffic module 100 is sent to the respective auxiliary data traffic module 102 on the client legacy computing device 208. That auxiliary data traffic module 102 then computes the response and forwards it to the data traffic module 100. Upon receipt of the response, the data traffic module 110 compares the response with the expected response. If there is a match, the auxiliary data traffic module 102 is considered authentic and then proceeds from the process of legacy device authentication to the process of firmware data integrity checking.

While the above describes the auxiliary data traffic module 102 as a dongle (such as a USB device), the auxiliary data traffic module 102 may likewise be implemented through a chip installed on a computing device motherboard, through a serial bus interface, or through such other supplementary processing devices as may occur to those skilled in the art.

In certain implementations, the data traffic manager 100 may also provide adaptive access control features by continuous monitoring of the data traffic accounting for past patterns that preempted an attack and making inferences about new patterns using machine learning techniques. For instance, multilayer perception (MLP) may be applied, which is a feed forward artificial neural network model that maps sets of input data onto a set of appropriate outputs. A MLP consists of multiple layers of nodes configured in a directed graph, with each layer fully connected to the next layer. With the exception of the input nodes, each node is a neuron with a nonlinear activation function. MLP utilizes a supervised learning technique called "back propagation" for training the network. Similarly, convolutional neural networks (CNN), which are biologically-inspired variants of MLP's, could likewise be employed. While many neutrally-inspired models exist, one that is believed to be particularly suitable for implementation in the system and methods described herein is the LeNet-5 model.

The foregoing system and method allows the establishment of a root-of-trust in heterogeneous computer networks having non-TPM enabled legacy components by providing a firmware combination that features one or more of remote attestation, integrity measuring, secure boot operations, remote authentication, and tamper resistance characteristics, all of which operate at the individual device level, as opposed to through software servicing in, for example, a cloud computing environment. In certain configurations, the data traffic module 100 and/or the auxiliary data traffic module 102 may be embedded in larger computers, laptops, tablets, cell phones, and the like. The systems and methods described herein particularly leverage the hardware platforms of the data traffic module 100 and the auxiliary data traffic module 102 configured as discussed above to provide anti-tamper resistance to prevent attacks from inside of a non-TPM enabled legacy network 10, secure boot support to prevent unsecure boot operations within the non-TPM enabled legacy network 10, remote firmware rollback protection to provide secure updates to legacy components in the non-TPM enabled legacy network 10, and adaptive security policy updates to ensure that all device access rules for the non-TPM enabled legacy network 10 are always up to date. Further, those skilled in the art will recognize that multiple data traffic modules 100 configured as discussed herein may be provided in a distributed network to provide deeper security, thus allowing a network system designer or manager to provide optimal security coverage as additional devices are added to the network, and enhancing overall resiliency of the network against attacks.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A system for providing a root-of-trust in a heterogeneous computer network, comprising:
   a local area network;
   a non-TPM enabled legacy network having one or more legacy components comprising one or more of a non-TPM enabled IoT device and a non-TPM enabled computing device; and
   a data traffic module in data communication with said non-TPM enabled legacy network and positioned between said local area network and said non-TPM enabled network, said data traffic module having computer executable code stored thereon configured to:
      provide remote attestation of said one or more legacy components to a trusted remote host computer outside of said system; and
      provide a distributed trusted platform module function to said non-TPM enabled IoT devices and non-TPM enabled computing devices to establish a hardware based root-of-trust within said heterogeneous network environment.

2. The system of claim 1, wherein upon determining at said data traffic module that said trusted remote host computer and said one or more legacy components fail to establish trust, and upon determining at said data traffic module that firmware and configuration hashtags on said one or more legacy components do not match firmware and configuration hashtags in secure memory on said data traffic module, said computer executable code on said data traffic module is further configured to deny data access to said one or more legacy components having non-matching firmware and configuration hashtags.

3. The system of claim 1, wherein said computer executable code on said data traffic module is further configured to monitor data communication among said legacy components and between said legacy components and remote computers outside of said system.

4. The system of claim 3, wherein said computer executable code is further configured to perform said monitoring in real time.

5. The system of claim 3, wherein said computer executable code is further configured to perform said monitoring using the host identity protocol (HIP).

6. The system of claim 5, wherein said computer executable code is further configured to determine whether a firmware and configuration hashtag on a first one of said legacy components match a firmware and configuration hashtag stored in secure memory on said data transfer module.

7. The system of claim 6, wherein said computer executable code is further configured to, upon determining that said firmware and configuration hashtag on said first one of said legacy components does not match a firmware and configuration hashtag stored in secure memory on said data transfer module, deny data access to said first one of said legacy components.

8. The system of claim 1, further comprising at least one auxiliary data traffic module in data communication with one of said non-TPM enabled computing devices on said non-TPM enabled legacy network.

9. The system of claim 8, wherein said auxiliary data traffic module further comprises computer executable code stored thereon configured to provide remote attestation and authentication of said one of said non-TPM enabled computing devices.

10. The system of claim 9, wherein said remote attestation and authentication provided by said auxiliary data traffic module is configured to prevent firmware downgrade and rollback attacks.

11. The system of claim 8, wherein said at least one auxiliary data traffic module is implemented on a dongle configured for physical connection to and data communication with a non-TPM enabled computing device.

12. The system of claim 1, wherein said data traffic module is implemented on a programmable multi-processor system-on-chip.

13. The system of claim 1, wherein said computer executable code on said data traffic module is further configured to provide at least one of the following functions:
(i) secure booting of said legacy components;
(ii) memory inaccessible by said legacy components;
(iii) sealed data storage storing cryptographic keys;
(iv) secure I/O operations;
(v) integrity measuring through computation of hashtags of executable code and configuration data;
(vi) tamper resistance;
(vii) public key cryptographic operations and random number generation;
(viii) real-time data traffic monitoring and control; and
(ix) adaptive access control.

14. The system of claim 1, wherein said computer executable code is further configured to provide said remote attestation by:
(i) receiving at said data traffic module a public/private key pair from an application stored on a location external to said non-TPM enabled legacy network;
(ii) certifying at said data traffic module said public/private key pair;
(iii) computing at said data traffic module a hashtag of an executable code of said application;
(iv) creating at said data traffic module a certification and signing said certification with an attestation identity key;
(v) sending from said data traffic module to said location external to said non-TPM enabled legacy network said certification of said public key and said hashtag with a certification issued to said data traffic module by a trusted certification authority;
(vi) receiving at said data traffic module from an external verification source an indication of whether said hashtag indicates that said executable code of said program is trustworthy; and
(vii) upon determining that said hashtag indicates that said executable code of said program is trustworthy, establishing at said data traffic module a session key enabling communication with one of said legacy components.

15. A data traffic module comprising:
a first data communication port configured for data communication with a first computer network;
a second data communication port configured for data communication with a second computer network comprising a non-TPM enabled legacy network having one or more legacy components comprising one or more of a non-TPM enabled IoT device and a non-TPM enabled computing device; and
at least one processor having computer executable code stored thereon configured to:
provide remote attestation of said one or more legacy components to a trusted remote host computer outside of said system; and
provide a distributed trusted platform module function to said non-TPM enabled IoT devices and non-TPM enabled computing devices to establish a hardware based root-of-trust within a heterogeneous network environment comprised of said first computer network and said second computer network.

16. The data traffic module of claim 15, wherein said data traffic module is implemented on a programmable multi-processor system-on-chip.

17. The data traffic module of claim 15, wherein said computer executable code is further configured to provide at least one of the following functions:
(i) secure booting of said legacy components;
(ii) memory inaccessible by said legacy components;
(iii) sealed data storage storing cryptographic keys;
(iv) secure I/O operations;
(v) integrity measuring through computation of hashtags of executable code and configuration data;
(vi) tamper resistance;
(vii) public key cryptographic operations and random number generation;
(viii) real-time data traffic monitoring and control; and
(ix) adaptive access control.

18. The data traffic module of claim 15, wherein said computer executable code is further configured to provide said remote attestation by:
(i) receiving at said data traffic module a public/private key pair from an application stored on a location external to said non-TPM enabled legacy network;
(ii) certifying at said data traffic module said public/private key pair;
(iii) computing at said data traffic module a hashtag of an executable code of said application;
(iv) creating at said data traffic module a certification and signing said certification with an attestation identity key;
(v) sending from said data traffic module to said location external to said non-TPM enabled legacy network said certification of said public key and said hashtag with a certification issued to said data traffic module by a trusted certification authority;
(vi) receiving at said data traffic module from an external verification source an indication of whether said hashtag indicates that said executable code of said program is trustworthy; and
(vii) upon determining that said hashtag indicates that said executable code of said program is trustworthy, establishing at said data traffic module a session key enabling communication with one of said legacy components.

* * * * *